W. J. GOODRICH.
OIL WIPER.
APPLICATION FILED APR. 19, 1918.
1,316,707.
Patented Sept. 23, 1919.
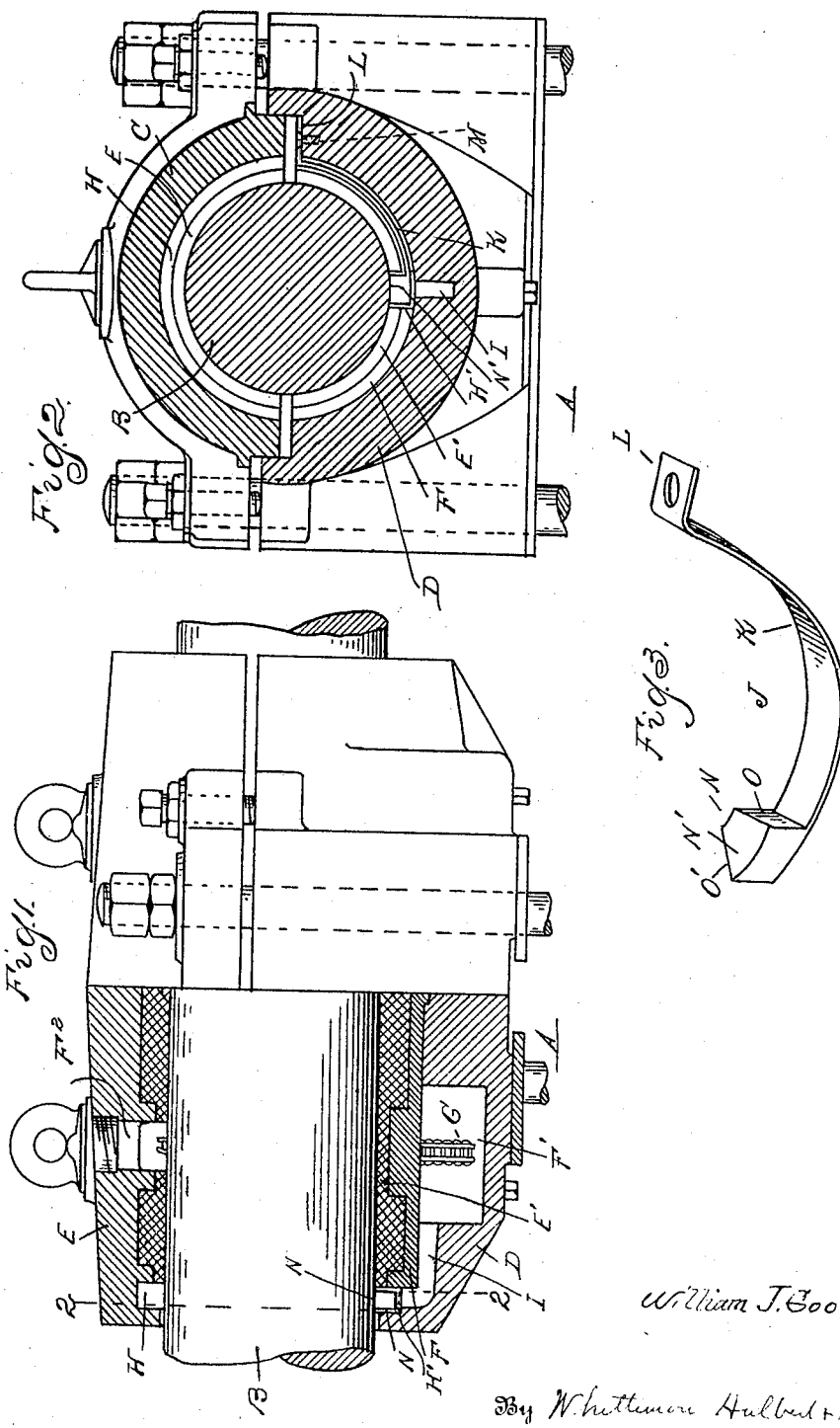
Inventor
William J. Goodrich
By Whittemore Hulbert & Whittemore
Attorneys

UNITED STATES PATENT OFFICE.

WILLIAM J. GOODRICH, OF DETROIT, MICHIGAN, ASSIGNOR OF ONE-THIRD TO HARRY HELFMAN AND ONE-THIRD TO SIDNEY M. SCHOTT, BOTH OF DETROIT, MICHIGAN.

OIL-WIPER.

1,316,707. Specification of Letters Patent. Patented Sept. 23, 1919.

Application filed April 19, 1918. Serial No. 229,583.

*To all whom it may concern:*

Be it known that I, WILLIAM J. GOODRICH, a citizen of the United States of America, residing at Detroit, in the county of Wayne and State of Michigan, have invented certain new and useful Improvements in Oil-Wipers, of which the following is a specification, reference being had therein to the accompanying drawings.

The invention relates to an oil wiper used on bearing boxes. One of the objects of the invention is to obtain a construction in which the wiper can be readily removed from the bearing box and replaced and will adjust itself to the shaft of any diameter and still maintain its contact therewith. Other objects of the invention reside in the novel arrangements and combinations of parts as more fully hereinafter set forth.

In the drawings:

Figure 1 is a sectional elevation through a bearing box to which the wiper is applied;

Fig. 2 is a cross section on the line 2—2 of Fig. 1;

Fig. 3 is a perspective view of the wiper.

A is the bearing box for the shaft B and comprises the complementary upper and lower box portions C and D respectively with the complementary segmental bearings E and E' formed of Babbitt metal, the lower bearing E' being supported by the segmental shell F mounted in the lower box portion D. The longitudinal halves of the bearing box are symmetrical and therefore a description of one half is sufficient. The lower box portion D is provided with the enlarged semicircular recess F' for retaining the lubricant and the upper segmental bearing E has the semicircular groove F² therein connecting with the recess F'. Suitable lubricating means, such as the continuous ladder chain G, is provided in the recess and groove and surrounding the shaft B for carrying the lubricant from the recess into the groove and upon the shaft. Both the upper and lower box portions C and D have adjacent their ends the complementary grooves H and H' respectively, the groove H' being connected with the enlarged recess F' by means of the passage-way I.

The wiper J lies within the groove H' and comprises the segmental arm K formed of resilient metal and having a laterally extending shank L secured to the lower box portion D between the upper and lower box portions C and D by the screw M. At the free end of the segmental arm K is the shoe N having the inner segmental face N' for fitting against the shaft B, this face having the oppositely inclined edges O and O'.

In use, the resiliency of the segmental arm K will permit the shoe N to adjust itself to the shaft B of any diameter and at the same time will maintain the shoe in contact with the shaft. The oil which is carried outward by the shaft B will be scraped off by the oblique edges O and O' of the shoe and forced backward and into the annular groove H', the oil then returning to the enlarged recess F' through the passage-way I. By having the oppositely inclined or oblique edges O and O', the wiper will efficiently operate when the shaft B is rotating in either direction.

An important feature of the invention resides in the arrangement of the parts whereby the wiper may be readily removed from the bearing box and replaced. This is due to the fact that the groove H' in the lower box portion D extends to the upper face of the lower box portion and the wiper is secured to the lower box portion at the joint between both the upper and lower box portions. Thus, in order to remove the wiper the upper box portion C is removed and the screw K removed when the wiper can be moved longitudinally of the groove H' and disengaged therefrom. The wiper may also be readily replaced by inserting the same into the groove H' and securing the laterally extending shank to the lower box portion of the bearing box.

What I claim as my invention, is:

1. The combination with a bearing box and shaft, said bearing box having a groove adjacent to one end thereof, of a wiper engageable with said groove independently of the shaft when the latter is in engagement with said bearing box and detachably secured within said bearing box.

2. The combination with a bearing box formed of complementary box portions and having an annular groove adjacent to one end thereof, of a wiper engaging in said groove, provided with a shoe having an inner segmental face, a segmental resilient arm and a laterally-extending portion secured to one of said box portions at the joint between both of said box portions.

3. The combination with a bearing box formed of complementary upper and lower box portions, the lower box portion having a groove therein adjacent to one end, extending to the upper surface thereof, of a wiper insertible longitudinally of said groove and secured to the upper surface of said lower box portion.

4. The combination with a bearing box formed of complementary upper and lower box portions, the lower box portion having a groove therein adjacent to one end, of a wiper engageable with said groove longitudinally thereof and secured to one of said box portions at the joint therebetween.

In testimony whereof I affix my signature.

WILLIAM J. GOODRICH.

Copies of this patent may be obtained for five cents each, by addressing the "Commissioner of Patents, Washington, D. C."